US011242798B2

(12) United States Patent
Haynes et al.

(10) Patent No.: US 11,242,798 B2
(45) Date of Patent: Feb. 8, 2022

(54) METHOD AND APPARATUS FOR AN ENGINE INLET FOR A RAM-AIR SYSTEM WITH AN ICING BYPASS

(71) Applicant: Bell Textron Inc., Fort Worth, TX (US)

(72) Inventors: David Haynes, Arlington, TX (US); Thomas Dewey Parsons, Fort Worth, TX (US); Shahryar Fotovati, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 467 days.

(21) Appl. No.: 16/294,266

(22) Filed: Mar. 6, 2019

(65) Prior Publication Data

US 2020/0284192 A1    Sep. 10, 2020

(51) Int. Cl.
| | |
|---|---|
| *F02C 7/04* | (2006.01) |
| *F02C 7/047* | (2006.01) |
| *B64C 27/28* | (2006.01) |
| *B64D 33/02* | (2006.01) |
| *B64C 29/00* | (2006.01) |

(52) U.S. Cl.
CPC .............. *F02C 7/047* (2013.01); *B64C 27/28* (2013.01); *B64C 29/0008* (2013.01); *B64D 33/02* (2013.01); *B64D 2033/0293* (2013.01); *F05D 2220/10* (2013.01); *F05D 2270/62* (2013.01); *F05D 2270/64* (2013.01)

(58) Field of Classification Search
CPC .... F02C 7/04; F02C 7/042; F02C 7/05; F02C 7/055; B64C 27/28; B64C 29/0008
See application file for complete search history.

(56) References Cited

U.S. PATENT DOCUMENTS

| | | | | |
|---|---|---|---|---|
| 3,329,377 A | * | 7/1967 | Peterson ................ | B64D 15/00 244/53 B |
| 3,430,640 A | * | 3/1969 | Lennard ................. | F02C 7/042 137/15.1 |
| 3,998,048 A | | 12/1976 | Derue | |
| 4,397,431 A | * | 8/1983 | Ben-Porat ............. | B64D 33/02 244/53 B |
| 5,116,251 A | * | 5/1992 | Bichler .................. | F02C 7/042 244/53 B |
| 5,694,763 A | * | 12/1997 | Amelio ................... | F02C 7/042 60/39.092 |
| 5,697,394 A | * | 12/1997 | Smith .................... | B64D 33/02 137/15.1 |
| 6,089,505 A | * | 7/2000 | Gruensfelder ......... | F02C 7/042 244/53 B |
| 6,896,003 B1 | | 5/2005 | Gieseke | |

(Continued)

*Primary Examiner* — Michael H Wang
(74) *Attorney, Agent, or Firm* — Shackelford, Bowen, McKinley & Norton, LLP

(57) ABSTRACT

An aircraft includes a fuselage and an engine housed in the fuselage. A ram-air engine inlet is formed on an exterior of the fuselage. The ram-air engine inlet is defined, at least in part, by a cowling door. The cowling door is moveable between a closed position and an open position. An intake duct fluidly couples the ram-air engine inlet to the engine. A filter is disposed across the intake duct. A bypass duct is formed in the ram-air engine inlet aft of the intake duct. The bypass duct is operable to be selectively opened and closed.

20 Claims, 11 Drawing Sheets

(56) References Cited

U.S. PATENT DOCUMENTS

| | | | |
|---|---|---|---|
| 8,512,450 B2* | 8/2013 | Kazlauskas | B64D 33/02 |
| | | | 95/269 |
| 10,054,050 B2 | 8/2018 | Labrecque et al. | |
| 10,227,925 B2* | 3/2019 | Snyder | F02C 7/052 |
| 2009/0261208 A1 | 10/2009 | Belyew | |
| 2011/0120075 A1 | 5/2011 | Diaz et al. | |
| 2011/0265650 A1 | 11/2011 | Kazlauskas et al. | |
| 2013/0087661 A1* | 4/2013 | Brown | B64D 29/02 |
| | | | 244/201 |
| 2014/0077039 A1 | 3/2014 | Scimone | |
| 2015/0048213 A1 | 2/2015 | Ross et al. | |
| 2016/0040595 A1* | 2/2016 | Devine | F02K 3/077 |
| | | | 415/2.1 |
| 2016/0075439 A1 | 3/2016 | Mores et al. | |
| 2016/0347479 A1 | 12/2016 | O'Neil et al. | |
| 2017/0284297 A1* | 10/2017 | Nestico | F02C 3/04 |
| 2018/0030926 A1 | 2/2018 | Eckett et al. | |
| 2018/0043986 A1 | 2/2018 | Miller et al. | |
| 2018/0105283 A1* | 4/2018 | Dionne | F01C 13/04 |
| 2018/0208323 A1 | 7/2018 | Parsons et al. | |
| 2019/0263531 A1* | 8/2019 | Kooiman | F02C 7/052 |
| 2020/0277897 A1* | 9/2020 | O'Brien | F02C 7/055 |
| 2021/0114720 A1* | 4/2021 | Landry | B64C 11/001 |

* cited by examiner

METHOD AND APPARATUS FOR AN ENGINE INLET FOR A RAM-AIR SYSTEM WITH AN ICING BYPASS

CROSS-REFERENCE TO RELATED APPLICATIONS

U.S. patent application Ser. No. 15/906,108, filed on Feb. 27, 2018 is incorporated herein by reference.

TECHNICAL FIELD

The present disclosure relates generally to aircraft ram-air systems and more particularly, but not by way of limitation, to ram-air systems that include a moveable cowling door, filter, and an icing bypass door.

BACKGROUND

This section provides background information to facilitate a better understanding of the various aspects of the disclosure. It should be understood that the statements in this section of this document are to be read in this light, and not as admissions of prior art.

Ram-air systems of rotor-wing and tiltrotor aircraft may include an inlet filter that cleans air directed into an engine of the ram-air system. Inlet filters separate dust, sand, and debris from the engine-inlet air during operation of the aircraft in harsh environmental conditions. Generally, an engine of a tiltrotor aircraft is housed in the aircraft fuselage; however, it may also be housed in a nacelle that is mounted to a wing. In certain flight conditions, ice particles may form and become entrained in air that is ingested into the ram-air system. Such ice particles may partially occlude the inlet filter and prevent ingestion of an adequate volume of air into the engine.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

Various aspects of the disclosure relate to an aircraft. The aircraft includes a fuselage and an engine housed in the fuselage. A ram-air engine inlet is formed on an exterior of the fuselage. The ram-air engine inlet is defined, at least in part, by a cowling door. The cowling door is moveable between a closed position and an open position. An intake duct fluidly couples the ram-air engine inlet to the engine. A filter is disposed across the intake duct. A bypass duct is formed in the ram-air engine inlet aft of the intake duct. The bypass duct door is operable to be selectively opened and closed.

Various aspects of the disclosure relate to a ram-air system. The ram air system includes a ram-air engine inlet that includes a cowling door. The cowling door is defined, at least in part, by a pair of side walls and a cross member disposed between and coupling the side walls. A bypass duct is formed in an aft aspect of the cowling door. The bypass duct door is operable to be selectively opened and closed. The cowling door is moveable between a closed position and an open position.

Various aspects of the disclosure relate to a method of operating a ram-air system. The method includes determining if forward airspeed of an aircraft provides sufficient airflow through a ram-air engine inlet. Responsive to a determination that the forward airspeed of the aircraft does not provide sufficient airflow through the ram-air engine inlet, a cowling door is opened thereby optimizing engine performance. Responsive to a determination that the forward airspeed of the aircraft provides sufficient airflow through the ram-air engine inlet, the cowling door is closed. In various embodiments, the method further includes determining if flight conditions are sufficient to cause ice formation. Responsive to a determination that flight conditions are not sufficient to cause ice formation, a bypass duct door is closed. Responsive to a determination that flight conditions are sufficient to cause ice formation, the bypass duct door is opened.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
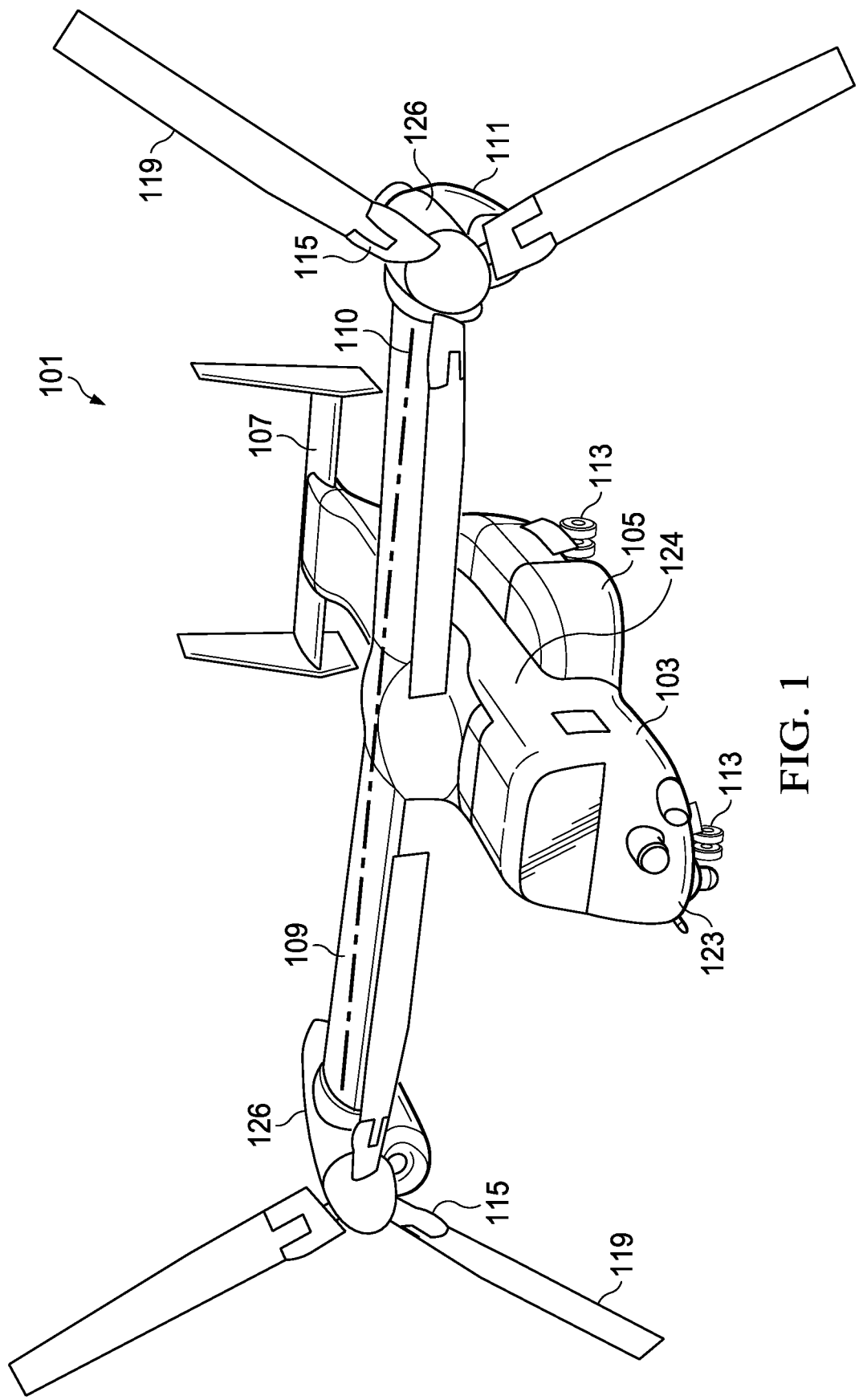
FIG. 1 is a perspective view of an aircraft in airplane mode according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

FIG. 1 is a perspective view of an aircraft 101 in airplane mode. The aircraft 101 includes a fuselage 103, a sponson 105, a tail member 107, a wing 109, a propulsion system 111, and a landing gear 113. The fuselage 103 represents the body of the aircraft 101. The wing 109 is coupled to the propulsion system 111 such that the propulsion system 111 provides at least one of lift and thrust to the aircraft 101. By way of example in FIG. 1, the wing 109 is illustrated as a single-wing assembly; however, in other embodiments, the wing 109 could include a dual-wing assembly. By way of example, FIG. 1 illustrates the aircraft 101 as a tilt-rotor aircraft; however, a person of skill in the art will recognize that certain aspects of the disclosure could be utilized in connection with any type of aircraft to include rotor-wing aircraft, high-speed rotor-wing aircraft, or any other type of aircraft.

The propulsion system 111 is coupled to an engine 124 housed within the fuselage 103. The propulsion system 111 includes a pivotable rotor 115 operatively connected to the engine 124 via, for example, a drive shaft. In various embodiments, the rotor 115 may be, for example, a helicopter rotor, a propeller, or a proprotor of the type used, for example, in tilt-rotor aircraft. In the case of tilt-rotor aircraft, for example, a nacelle 126 and the rotor 115 pivot about a long axis 110 of the wing 109 so as to orient the rotor 115 between an airplane mode (also commonly referred to as "cruise mode") and a helicopter mode (also commonly referred to a vertical take-off and landing ("VTOL") mode). The rotor 115 has a plurality of rotor blades 119 associated therewith. A position of the rotor 115, as well as a pitch of the rotor blades 119, can be selectively controlled via, for example, cyclic or collective controls by a pilot to determine heading, thrust, and lift of the aircraft 101. By way of example, FIG. 1 illustrates the aircraft 101 in the airplane mode, in which the rotor 115 is arranged in a substantially forward-facing orientation to impart a forward thrust to the aircraft 101. A lifting force is supplied by the wing 109. When in the helicopter mode, the rotor 115 is positioned in a substantially vertical orientation so as to impart a lifting thrust to the aircraft 101. In various embodiments, the aircraft 101 can be operated such that the rotor 115 is selectively positioned between the airplane mode and the helicopter mode, which is referred to as a conversion mode. While the engine 124 is described herein as being housed within the fuselage 103, the engine 124 may, in various embodiments, be housed within the nacelle 126 coupled to a distal end of the wing 109.

Figure 2A:
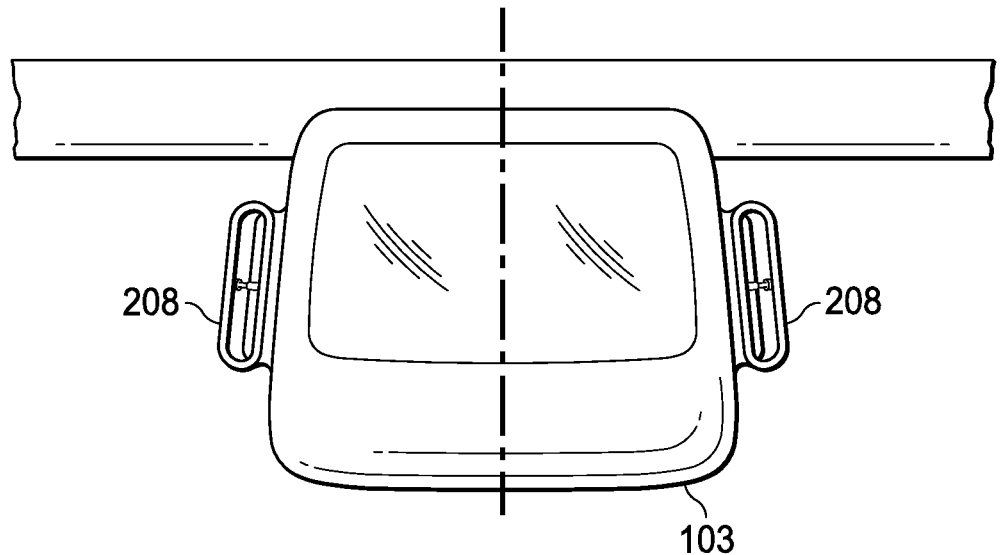
FIG. 2A is a front view of an aircraft fuselage illustrating ram air intakes according to aspects of the disclosure.
Figure 2B:
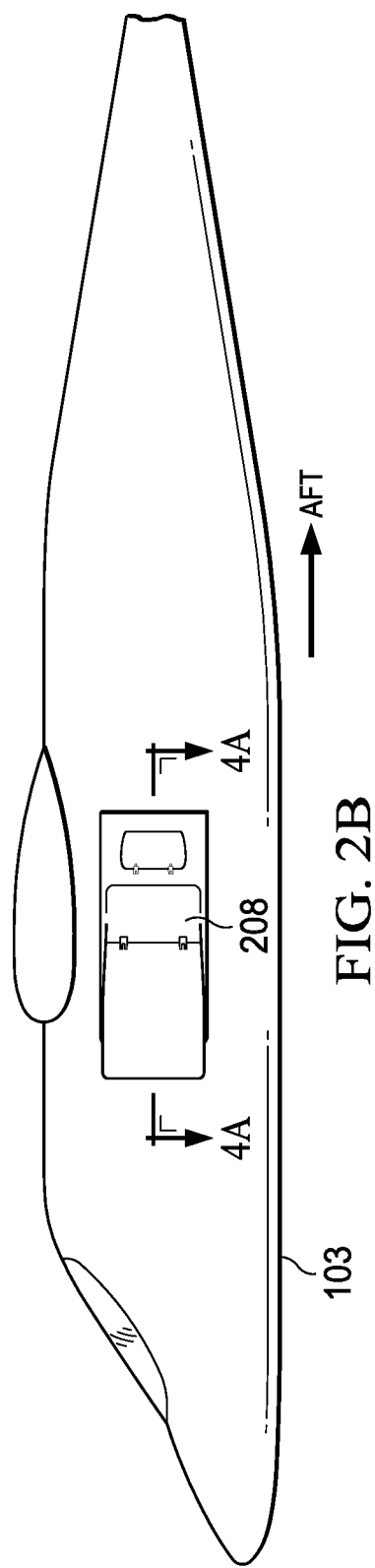
FIG. 2B is a side view of an aircraft fuselage illustrating ram air intakes according to aspects of the disclosure.

FIG. 2A is a front view of the fuselage 103 of the aircraft 101. FIG. 2B is a side view of the fuselage 103 of the aircraft 101. The fuselage 103 includes a ram-air engine inlet 208 positioned on a side of the fuselage 103. As illustrated by way of example in FIG. 2, in various embodiments, two ram air inlets 208 may be positioned on opposite sides of the fuselage 103.

Figure 3:
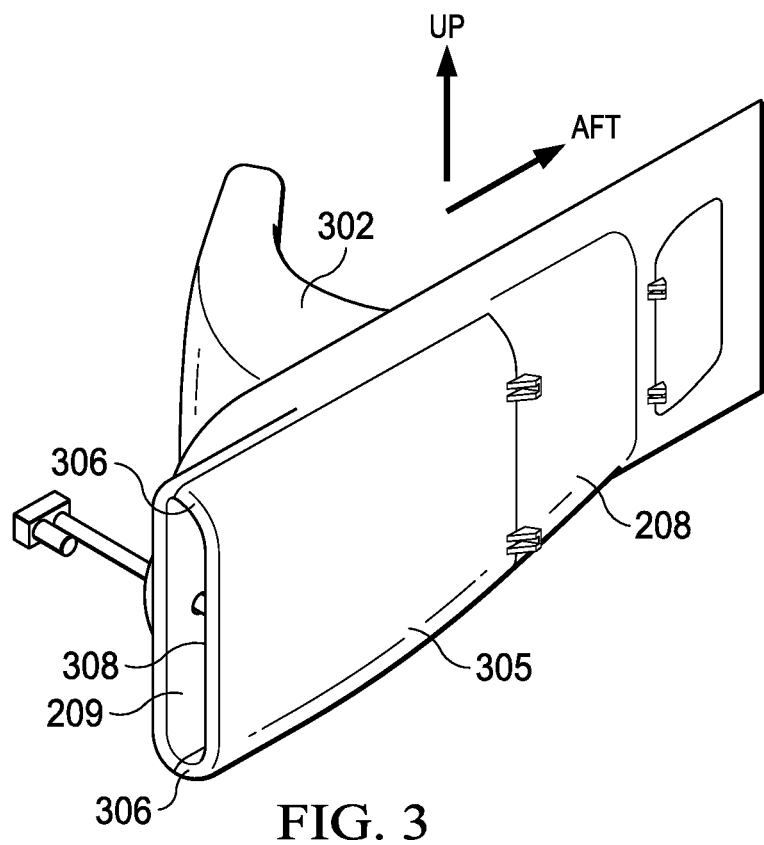
FIG. 3 is a perspective view of a ram air intake according to aspects of the disclosure.

FIG. 3 is a perspective view of the ram-air engine inlet 208. The ram-air engine inlet 208 includes an intake opening 209 that is defined by a cowling door 305. The intake opening 209 is a forward-facing opening that is fluidly coupled to an intake duct 302. During operation, the intake duct 302 directs air that enters the intake opening 209 towards the engine 124. In a typical embodiment, the ram-air engine inlet 208 uses dynamic air pressure created by forward motion of the aircraft 101 to increase static air pressure inside the intake duct 302. Such an arrangement facilitates a greater mass flow rate of air through the engine 124 and increases power of the engine 124. The intake opening 209 is forward facing to take advantage of the dynamic air pressure created as the aircraft 101 moves in generally horizontal flight. The cowling door 305 is movable between an open position and a closed position and is defined by side walls 306 and a cross member 308. By way of example, the ram-air engine inlet 208 is shown in FIGS. 2A-3 as being arranged on a side of the fuselage 103; however, in other embodiments, the ram-air engine inlet 208 could be located at any position on an exterior of the fuselage 103 or the nacelle 126.

Figure 4A:
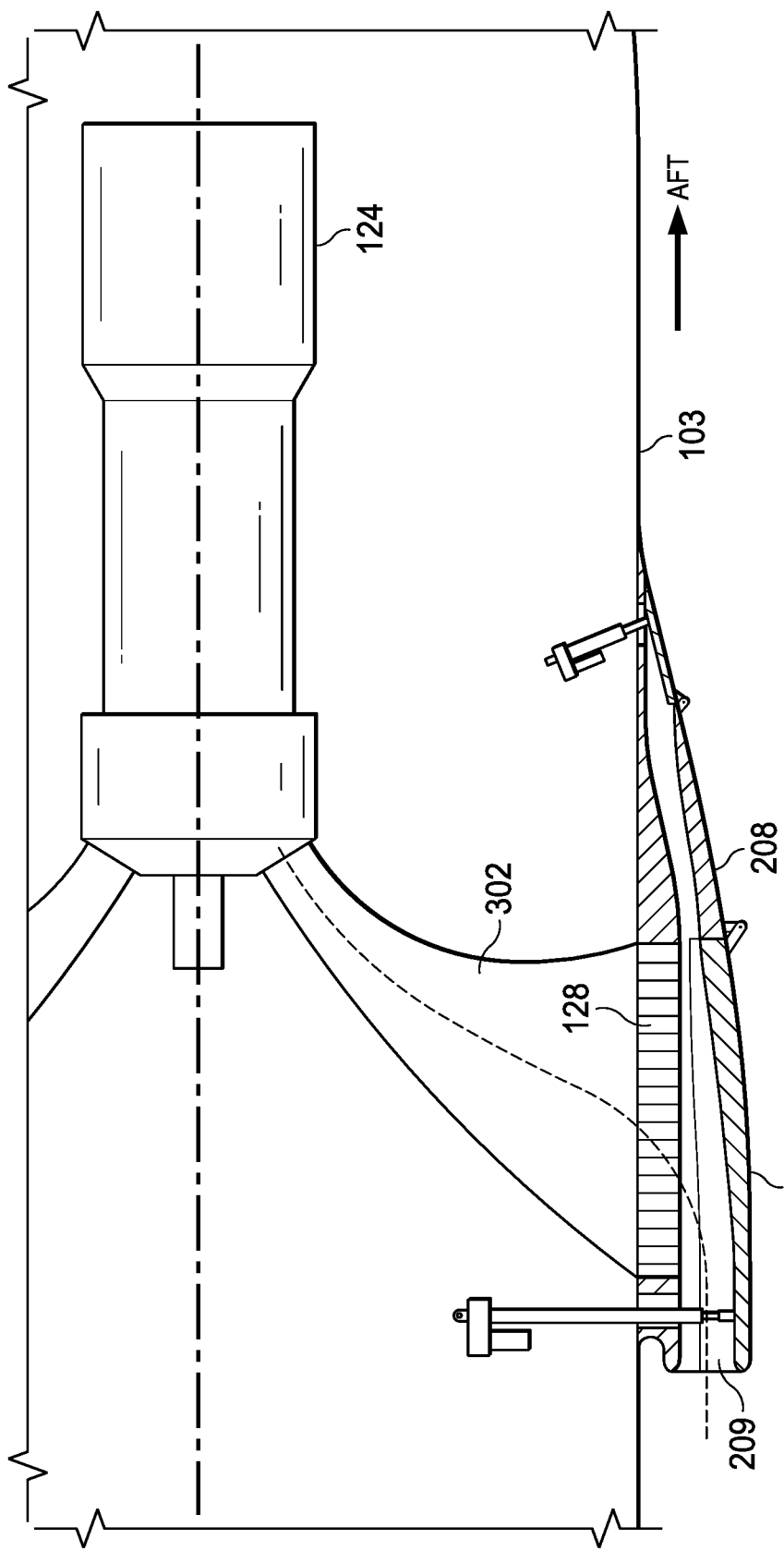
FIG. 4A is a cross-sectional view of a ram air intake of an aircraft in airplane mode according to aspects of the disclosure.
Figure 4B:
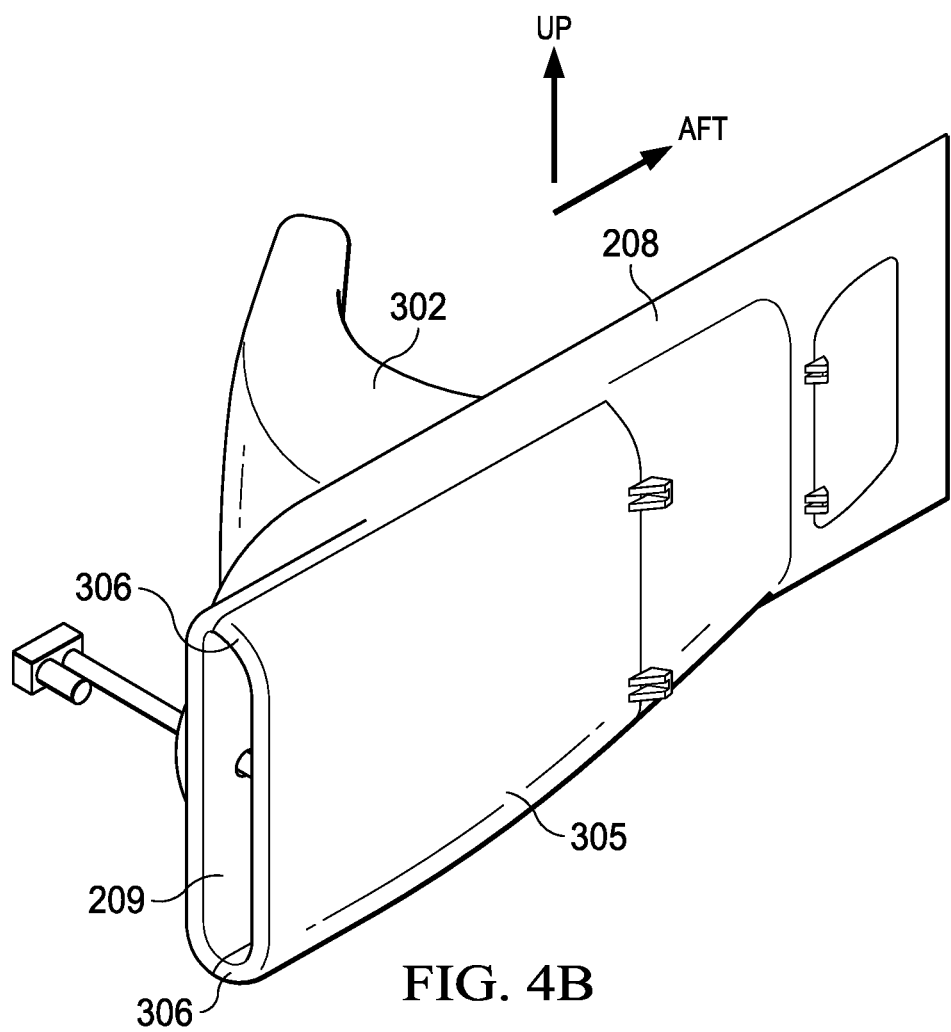
FIG. 4B is a perspective view of a ram air intake of an aircraft in airplane mode according to aspects of the disclosure.

FIG. 4A is a cross-sectional view of the ram-air engine inlet 208 in the airplane mode. FIG. 4B is a perspective view of the ram-air engine inlet 208 in the airplane mode. A filter 128 is arranged within the ram-air engine inlet 208 and is positioned across the intake duct 302 that is fluidly coupled to the engine 124. In various embodiments, a plane of the filter 128 is generally perpendicular to a plane of the ram-air engine inlet 208 and generally parallel to a plane of an exterior of the fuselage 103; however, in other embodiments, other arrangements could be utilized. A location of the ram-air engine inlet 208 and the filter 128 is not limited to a side of the fuselage 103 and, in various embodiments, could be positioned anywhere on the nacelle 126 or fuselage 103 where space permits depending on a configuration of the aircraft 101. The filter 128 separates dust and debris from air that is drawn in through the ram-air engine inlet 208. When the cowling door 305 is in the closed position, the side walls 306 abut the fuselage 103 such that the cowling door 305 conceals an entrance to the intake duct 302 and conceals the filter 128.

Figure 5A:
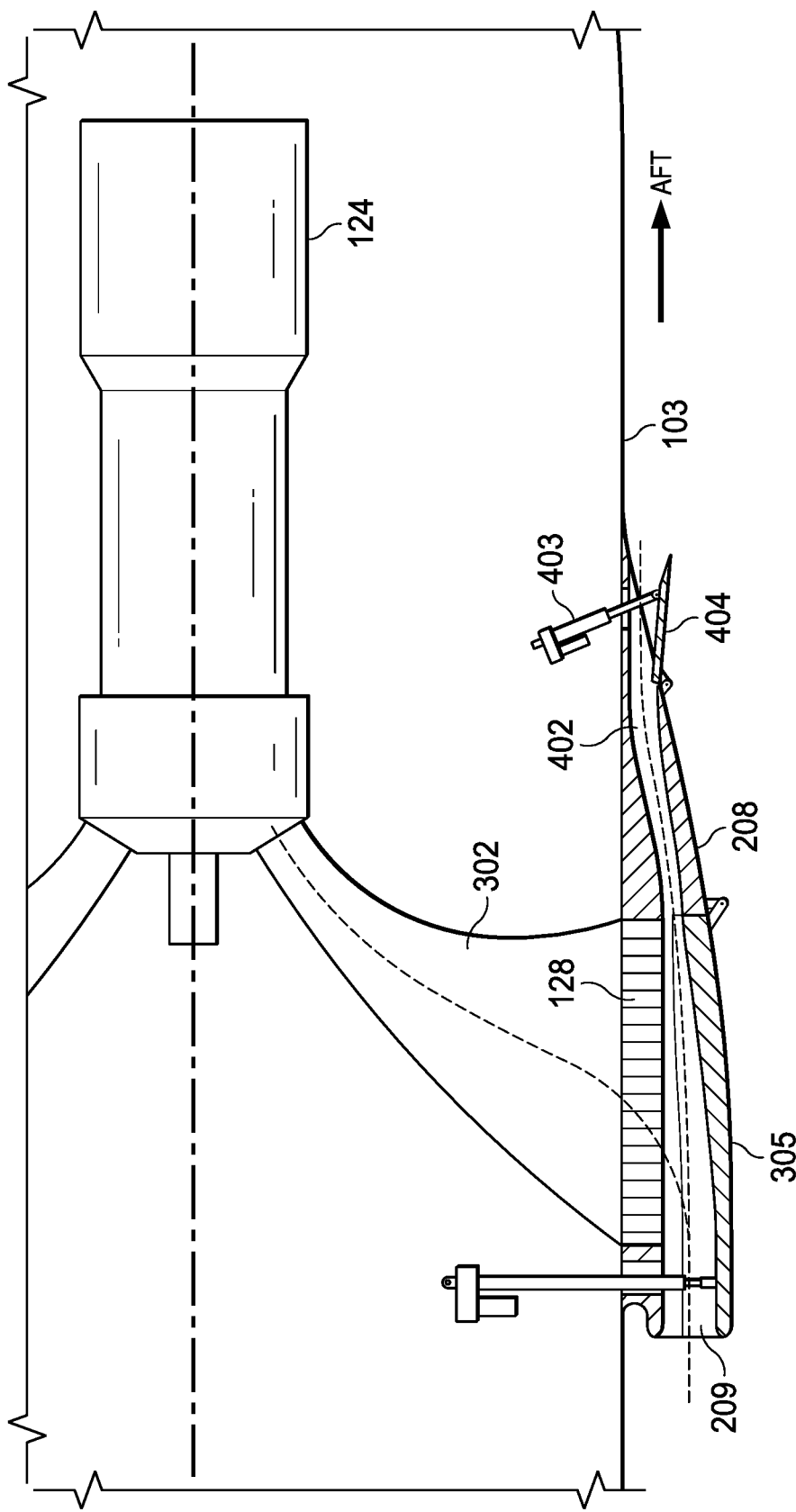
FIG. 5A is a cross-sectional view of a ram air intake showing a bypass duct with the bypass duct door open according to aspects of the disclosure.
Figure 5B:
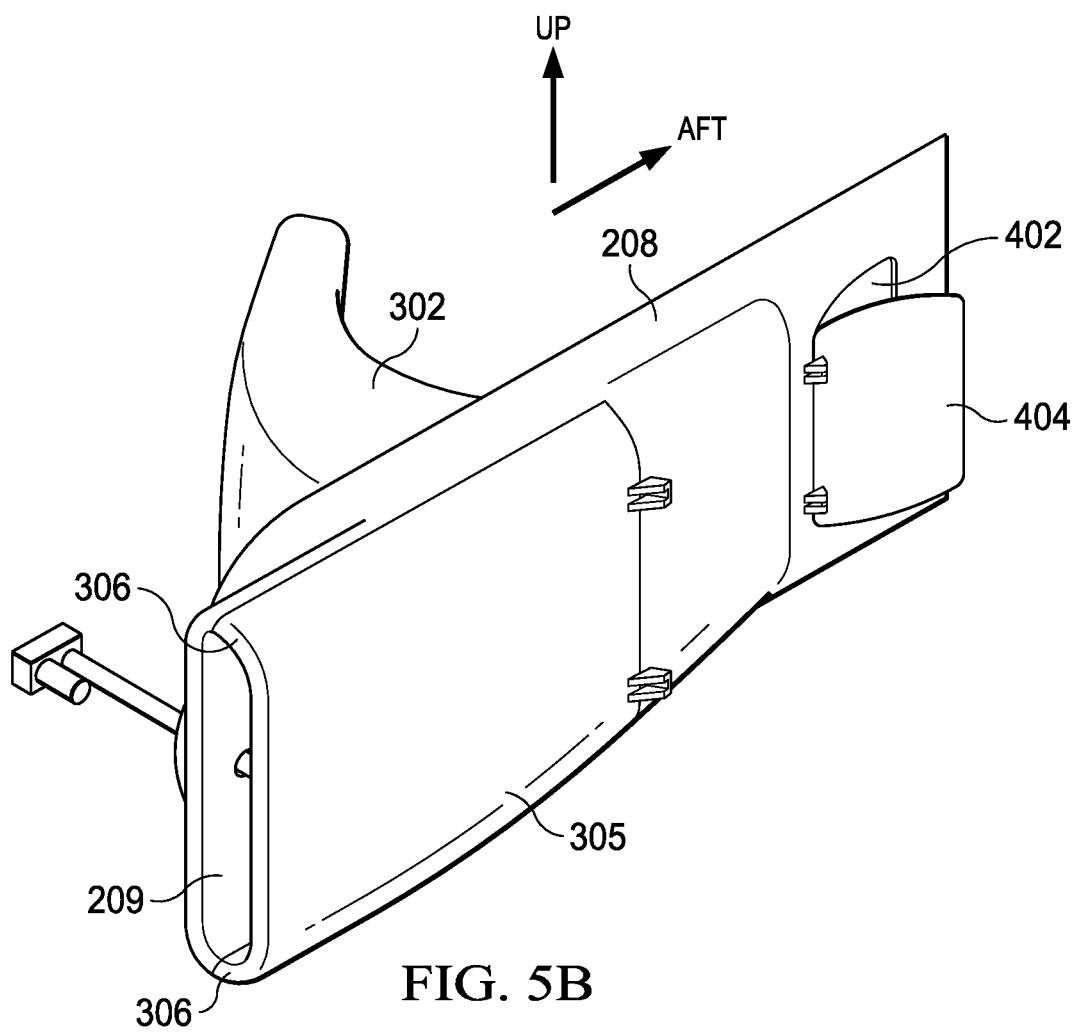
FIG. 5B is a perspective view of a ram air intake showing a bypass duct with the bypass duct door open according to aspects of the disclosure.

FIG. 5A is a cross-sectional view of the ram-air engine inlet 208 showing a bypass duct 402 with a bypass duct door 404 open. FIG. 5B is a perspective view of the ram-air engine inlet 208 showing the bypass duct 402 with the bypass duct door 404 open. The bypass duct 402 is positioned aft of the filter 128 and is fluidly coupled to the ram-air engine inlet 208. In various embodiments, the bypass duct 402 may include, for example, the bypass duct door 404 that is movable between an open position and a closed position via, for example an actuator 403. In various embodiments, the actuator 403 could be, for example, a hydraulic actuator, an electric actuator, or any other type of actuator. When the aircraft 101 is operating in the airplane mode at altitudes or temperatures sufficient to cause ice formation, the bypass duct 402 is opened to allow ice particles entrained in the intake air stream to pass out of the ram-air engine inlet 208 without entering or occluding the filter 128. During operation, horizontal momentum of the ice particles causes the ice particles to pass out of the ram-air engine inlet 208 through the bypass duct 402 and not be drawn into the filter 128 where the ice particles could either occlude the filter 128 or be ingested into the engine 124. The bypass duct 402 is formed aft of the cowling door 305 and the ram-air engine inlet 208. When the bypass duct 402 is opened, air is able to follow a substantially straight path through the ram-air engine inlet 208 and the cowling door 305 to the bypass duct 402, thereby facilitating passage of entrained ice particles from the ram-air engine inlet 208. In various embodiments, the ram-air engine inlet 208 provides improved performance that can be qualified for use during icing conditions.

Figure 6A:
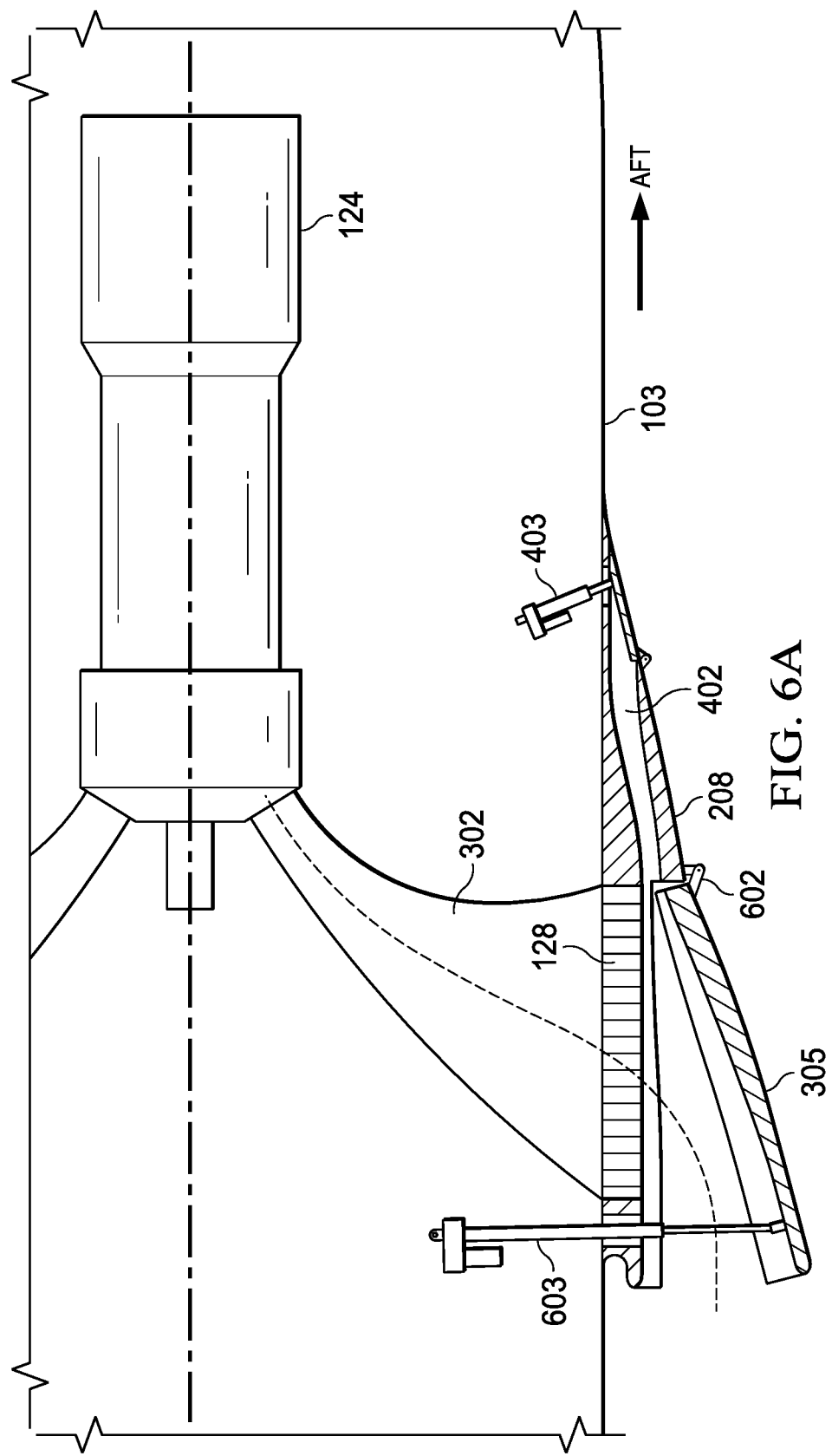
FIG. 6A is a cross-sectional view of a ram air intake of an aircraft in helicopter mode with the bypass duct door closed according to aspects of the disclosure.
Figure 6B:
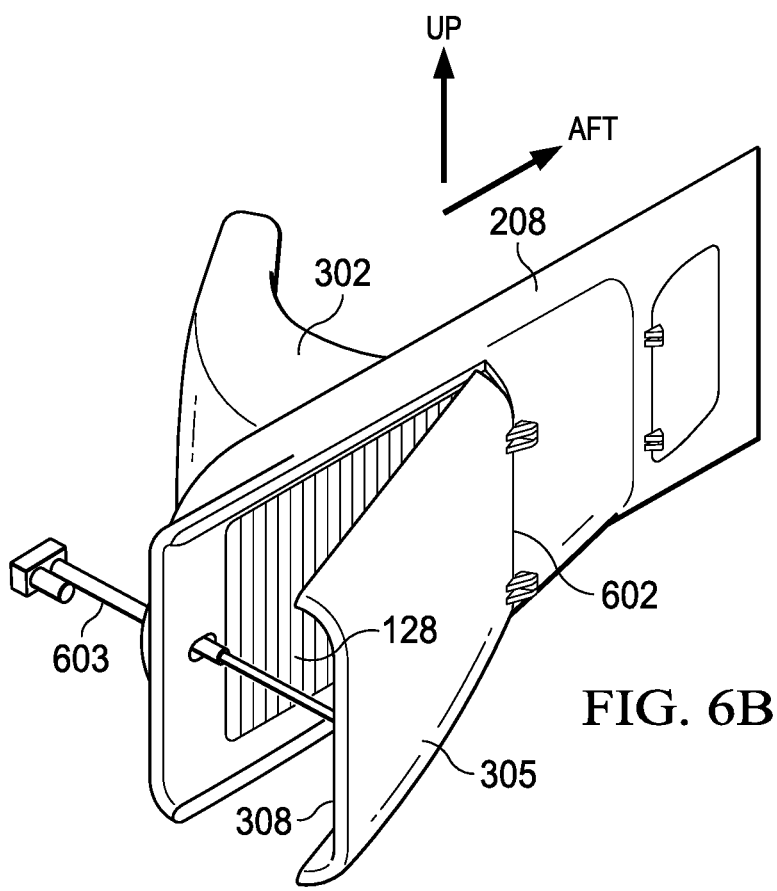
FIG. 6B is a perspective view of a ram air intake of an aircraft in helicopter mode with the bypass duct door closed according to aspects of the disclosure.
Figure 6C:
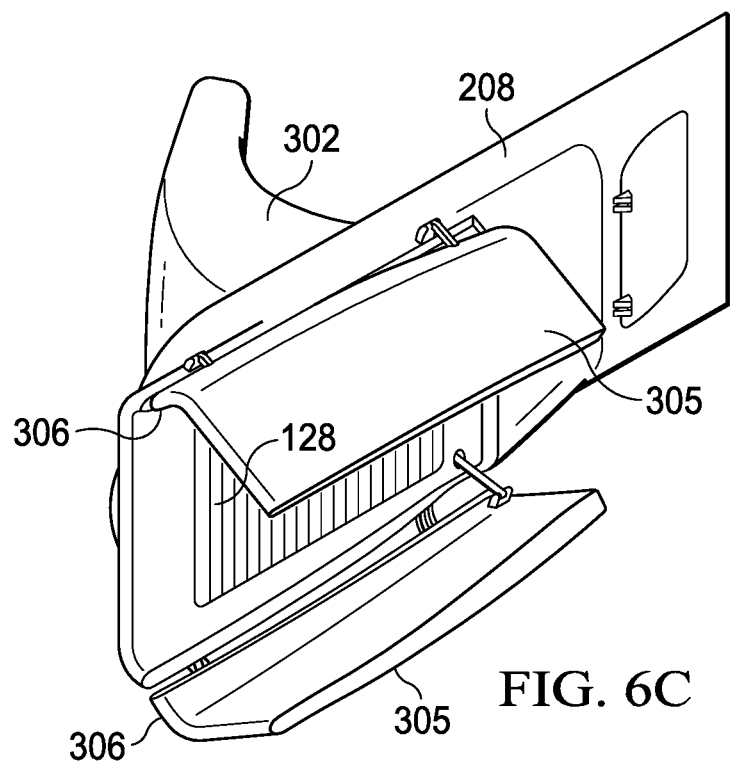
FIG. 6C is a perspective view of a ram air intake of an aircraft in helicopter mode with clam-shell cowling door open and the bypass duct door closed according to aspects of the disclosure.

FIG. 6A is a cross-sectional view of the ram-air engine inlet 208 in the helicopter mode with the bypass duct door 404 closed. FIG. 6B is a perspective view of the ram-air engine inlet 208 in the helicopter mode with the bypass duct door 404 closed. The cowling door 305 is movable between an open position and a closed position via, for example, an actuator 603. As shown by way of example in FIG. 6, the cowling door 305 may, in various embodiments, be hingedly coupled to the bypass duct 402 along an aft edge 602 of the cross member 308. In such an arrangement, the cowling door 305 rotates outwardly relative to the exterior of the fuselage 103 about the aft edge 602 of the cowling door 305. As shown in FIG. 6C, however, the cowling door 305 may, in various embodiments, be hingedly coupled to the fuselage 103 along one or both side walls 306 such that the cowling door 305 opens laterally in a clam-shell-like manner relative to the exterior of the fuselage 103. As illustrated in FIGS. 2-5B, when the aircraft 101 is operating in the airplane mode, the cowling door 305 is in the closed position, such that air is drawn in through the ram-air engine inlet 208. When the aircraft 101 is operating in the helicopter mode, the cowling door 305 moves to the open position such that air may be drawn into the intake duct 302 directly through the filter 128. During operation in the helicopter mode, opening the cowling door 305 minimizes restrictions to air flow in front of the filter 128 thereby improving engine performance in situations where the aircraft 101 has minimal forward motion. During such operation, sand grit, salt air spray/mist, and other contaminants entrained in the air are captured by the filter 128 and are prevented from being ingested by the engine 124.

Figure 7:
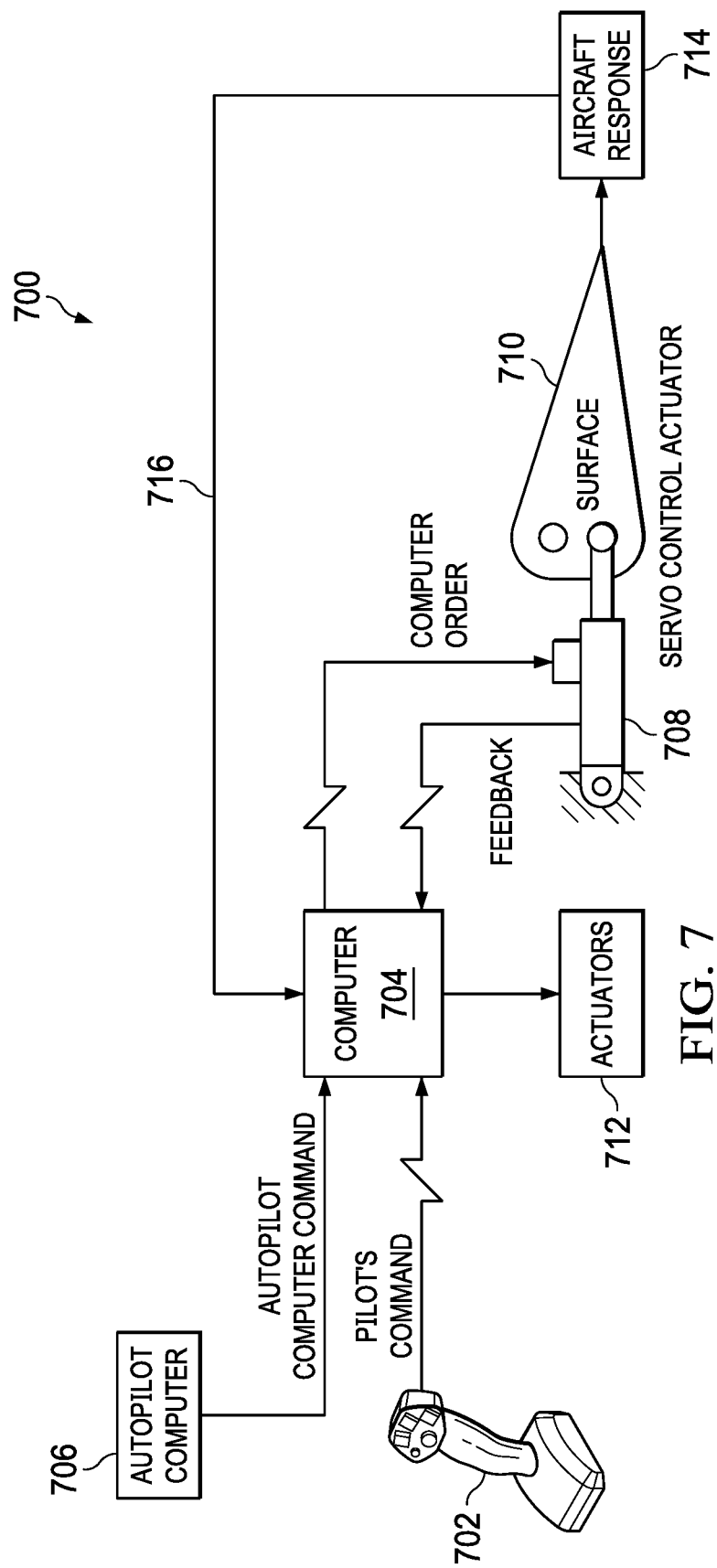
FIG. 7 is a block diagram of a flight-control system according to aspects of the disclosure.

FIG. 7 is a block diagram of a flight-control system 700 associated with the aircraft 101. For purposes of discussion, FIG. 7 is described herein relative to FIGS. 1-6. Pilot controls 702 provide flight commands to a flight-control computer 704. In various embodiments, the flight-control system 700 may include multiple redundant flight-control computers 704. In various embodiments, the flight commands may include, for example, airspeed, pitch, roll, yaw, rate of climb, heading, and rotor position. In some embodiments, an autopilot system 706 may also provide flight commands to the flight-control computer 704. The flight-control computer 704 interprets the flight commands and signals servo motors 708 which actuate control surfaces 710 such as, for example ailerons, flaps, elevators, and rudder. In other embodiments, the servo motors 708 may also control, for example, a position of the landing gear 113. The flight-control computer 704 may also signal actuators 712, which control an angular position of the nacelles 126 as well as an angle of attack of the rotor blades responsive to, for example, collective or cyclic commands received from either the pilot controls 702 or the autopilot system 706. In various embodiments, the actuators 712 could be, for example, electric motors and may, in various embodiments be, for example, swashplate actuators, nacelle-position acutators, throttle actuators, landing-gear actuators, or any other type of actuator for controlling a flight parameter. For example, the actuators 712 may, in various embodiments, include the actuator 403 for moving the door 404 associated with the bypass duct 402 and the actuator 603 for moving the cowling door 305.

Still referring to FIG. 7, the flight-control computer 704 measures a response 714 of the aircraft 101. In various embodiments, the flight-control computer 704 measures the aircraft response 714 by measuring a flight parameter such as, for example, actual rate of climb, actual airspeed, actual heading, and other flight parameters. The flight-control computer 704 receives feedback 716 related to actual performance of the aircraft 101. In various embodiments, the flight-control computer 704 may adjust at least one of the control surfaces 710 or the position of the rotors 115 to minimize differences between a commanded performance of the aircraft 101 and an actual performance of the aircraft 101. In various embodiments, the flight-control computer 704 may adjust at least one flight parameter to mitigate an unsafe condition.

Figure 8:
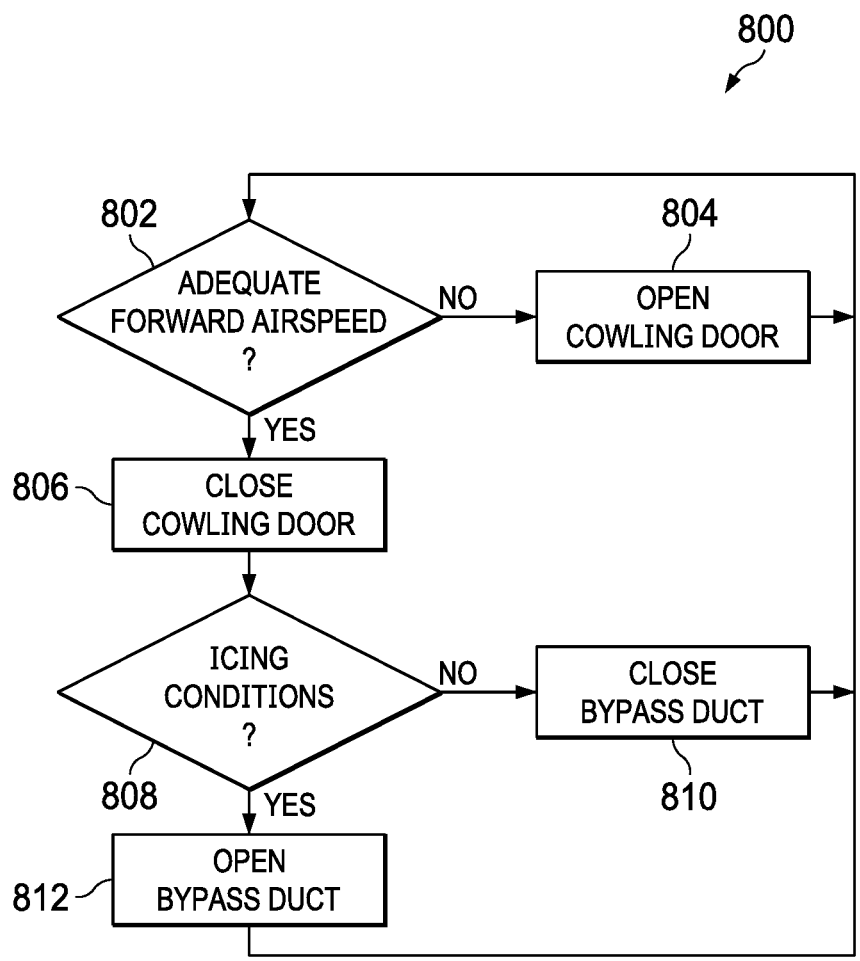
FIG. 8 is a flow diagram of a process for operating a ram-air system according to aspects of the disclosure.

FIG. 8 is a flow diagram of a process 800 for operating a ram-air system. At block 802 it is determined if the aircraft 101 has sufficient forward airspeed to provide sufficient ram air through the ram-air engine inlet 208. In various embodiments, block 802 could be performed, for example, by the flight-control computer 704; however, in other embodiments, block 802 could be a determination made, for example, by a pilot of the aircraft 101. Responsive to a determination that the aircraft 101 does not have sufficient forward airspeed, the process 800 proceeds to block 804. At block 804, the cowling door 305 is opened in an effort to minimize restrictions in front of the filter 128. In various embodiments, block 804 may be performed manually, for example, by the pilot or automatically, for example, by the flight-control computer 704. From block, 804, the process 800 returns to block 802. Responsive to a determination that the aircraft 101 does have sufficient forward airspeed, the process 800 proceeds to block 806. At block 806, the cowling door 305 is closed in an effort to direct air through the ram-air engine inlet 208. In various embodiments, block 806 may be performed manually, for example, by the pilot or automatically, for example, by the flight-control computer 704.

Still referring to FIG. 8, at block 808, a determination is made if flight conditions are sufficient to cause ice formation. In various embodiments, block 808 could be performed, for example, by the flight-control computer 704; however, in other embodiments, block 808 could be a determination made, for example, by the pilot of the aircraft 101. Responsive to a determination that icing conditions are not present, the process 800 proceeds to block 810. At block 810, the bypass duct 402 is closed. In various embodiments, block 810 may be performed manually, for example, by the pilot or automatically, for example, by the flight-control computer 704. From block, 810, the process 800 returns to block 802. Responsive to a determination that icing conditions are present, the process 800 proceeds to block 812. At block 812, the bypass duct 402 is opened in an effort to prevent occlusion of the filter 128 by ice particles entrained in air ingested into the ram-air engine inlet 208. In various embodiments, block 812 may be performed manually, for example, by the pilot or automatically, for example, by the flight-control computer 704. From block, 812, the process 800 returns to block 802.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An aircraft comprising:
    a computer;
    a fuselage;
    an engine housed in the fuselage;
    a ram-air engine inlet formed on an exterior of the fuselage, the ram-air engine inlet being defined, at least in part, by a cowling door, the cowling door being moveable between a closed position and an open position;
    wherein the computer determines whether forward airspeed of the aircraft provides sufficient ram air flow to the engine through the ram-air engine inlet and opens or closes the cowling door responsive to the determination of whether the forward airspeed of the aircraft provides sufficient ram air flow to the engine;
    an intake duct fluidly coupling the ram-air engine inlet to the engine;
    a filter disposed across the intake duct;
    a bypass duct formed in the ram-air engine inlet aft of the intake duct, the bypass duct operable to be selectively opened and closed; and
    wherein the computer determines whether flight conditions are sufficient to cause ice formation and opens or closes the bypass duct responsive to the determination of whether the flight conditions are sufficient to cause ice formation.

2. The aircraft of claim 1, wherein the aircraft is a tiltrotor aircraft.

3. The aircraft of claim 1, wherein the bypass duct comprises a door that is moveable between a closed position and an open position.

4. The aircraft of claim 3, wherein the door of the bypass duct is actuated by at least one of an electric actuator and a hydraulic actuator.

5. The aircraft of claim 1, wherein, when in the open position, the bypass duct facilitates passage of ice out of the ram-air engine inlet.

6. The aircraft of claim 5, wherein the bypass duct reduces occlusion of the filter.

7. The aircraft of claim 1, wherein a plane of the ram-air engine inlet is substantially perpendicular to a plane of the filter.

8. The aircraft of claim 1, wherein, in the closed position, the cowling door conceals the filter and an entrance to the intake duct.

9. The aircraft of claim 1, wherein, in the open position, the cowling door reduces restrictions to air flow into the intake duct.

10. A ram-air system for an aircraft, the ram-air system comprising:
    a computer;
    a ram-air engine inlet comprising a cowling door, the cowling door being defined, at least in part, by a pair of side walls and a cross member disposed between and coupling the pair of side walls;
    wherein the computer determines whether forward airspeed of the aircraft provides sufficient ram air flow through the ram-air engine inlet and opens or closes the cowling door responsive to the determination of whether the forward airspeed of the aircraft provides sufficient ram air flow;
    a bypass duct formed in an aft aspect of the cowling door, the bypass duct operable to be selectively opened and closed; and
    wherein the computer determines whether flight conditions are sufficient to cause ice formation and opens or closes the bypass duct responsive to the determination of whether the flight conditions are sufficient to cause ice formation.

11. The ram-air system of claim 10, wherein the cowling door abuts a fuselage.

12. The ram-air system of claim 11, wherein the cowling door is hingedly coupled to the fuselage along an aft edge of the cowling door.

13. The ram-air system of claim 11, wherein the cowling door is hingedly coupled to the fuselage along at least one of the pair of side walls.

14. The ram-air system of claim 10, wherein the bypass duct comprises a door that is moveable between a closed position and an open position.

15. The ram-air system of claim 10, wherein the cowling door is hingedly coupled to a nacelle.

16. A method of operating a ram-air system, the method comprising:
    determining if forward airspeed of an aircraft provides sufficient airflow through a ram-air engine inlet;
    responsive to a determination that the forward airspeed of the aircraft does not provide sufficient ram air flow through the ram-air engine inlet, opening a cowling door;
    responsive to a determination that the forward airspeed of the aircraft provides sufficient ram air flow through the ram-air engine inlet, closing the cowling door;
    determining if flight conditions are sufficient to cause ice formation;
    responsive to a determination that flight conditions are not sufficient to cause ice formation, closing a bypass duct; and
    responsive to a determination that flight conditions are sufficient to cause ice formation, opening the bypass duct.

17. The method of claim 16, wherein the determining if forward airspeed of an aircraft provides sufficient airflow through a ram-air engine inlet is performed by a flight-control computer.

18. The method of claim 16, wherein:
    the opening the cowling door is performed by a flight-control computer; and
    the closing the cowling door is performed by the flight-control computer.

19. The method of claim 16, wherein the determining if flight conditions are sufficient to cause ice formation is performed by a flight-control computer.

20. The method of claim 16, wherein:
- the closing the bypass duct is performed by a flight-control computer; and
- the opening the bypass duct is performed by the flight-control computer.

* * * * *